May 17, 1966  E. D. GRIFFITH  3,252,130
SEISMO-PHASE METHOD OF GEOPHYSICAL EXPLORATION
Filed Nov. 1, 1963  5 Sheets-Sheet 1

Fig. 1.

INVENTOR
Edward D. Griffith

BY Mason, Fenwick & Lawrence
ATTORNEYS

Fig. 2.

a. INPUT SIGNAL
b. OUTPUT SIGNAL (UNCOMPENSATED)
c. OUTPUT 180° OUT OF PHASE
d. TOTAL INPUT SIGNAL
e. RESULTANT OUTPUT SIGNAL

Fig. 3.
CONVENTIONAL SEISMIC PULSE
INPUT

Fig. 4.
EARTH SYSTEM FILTER

Fig. 5.
RICKER WAVELET

May 17, 1966 E. D. GRIFFITH 3,252,130
SEISMO-PHASE METHOD OF GEOPHYSICAL EXPLORATION
Filed Nov. 1, 1963 5 Sheets-Sheet 3

INVENTOR
Edward D. Griffith

BY Mason, Fenwick & Lawrence
ATTORNEYS

United States Patent Office 3,252,130
Patented May 17, 1966

3,252,130
SEISMO-PHASE METHOD OF GEOPHYSICAL EXPLORATION
Edward Dale Griffith, 1509 Argonne Drive, Dallas, Tex.
Filed Nov. 1, 1963, Ser. No. 320,699
8 Claims. (Cl. 340—15.5)

This invention relates to a method and apparatus for seismograph exploration and more particularly to a method and apparatus for conducting a seismic survey which will produce a high resolution reflection and/or refraction seismogram that will identify and measure depth of subsurface geologic strata with greater precision and accuracy than has been previously possible.

There are in use, at the present time, several methods of seismograph exploration. One such method uses charges of dynamite detonated in near-surface formations of the earth to form a seismic pulse. These seismic waves generated by such explosions travel through the earth to subsurface interfaces where they are reflected and/or refracted. Such reflected and/or refracted energy travels back to the surface where it is conventionally detected, amplified, filtered, and recorded. Another method of seismograph exploration, generally similar to the one above, utilizes a weight which is dropped against the ground to generate the seismic pulse and to simulate the so-called "shot instant" of the exploding charges of the first method. A major disadvantage of these two methods is that the associated spectra of the seismic pulses cover a broad band of frequencies to which the earth in the coupling, transmission, reflection and/or refraction process acts with a filtering action. For these pulse methods of seismic exploration the results of this filtering action is a distorted output wave form in the seismic event as it arrives at the earth's surface. This distorted seismic event is commonly known in geophysics as the Ricker wavelet and, because of its distorted wave form resulting in its relatively long period, and its variable characteristics from one survey location to another, resolution is invariably lost.

A more recent method of seismograph exploration utilizes, rather than a seismic pulse, a source of steady-state sine wave signals of constant amplitude and frequency imparted into the earth by a ground driver. These steady-state signals are detected at stations spaced one from the other and from the driving station or "shot point" as in the usual pulse method of seismic exploration. At a time which corresponds to the "shot instant" the driving force is abruptly terminated and in the decaying signal subsequently received at the detecting stations changes in amplitude and phase occur in abrupt steps as the terminated trains of seismic waves from the various strata formations are received. In this method, as is the case of the pulse methods, a broad band frequency spectrum is associated with the terminated sine wave function. Because of the filtering action of the earth which distorts the conventional seismic pulse, the terminated sine wave is likewise distorted. This distortion will take the form of a residual oscillation occurring after the termination time in the seismic output signal arriving at the surface of the earth from each reflector and/or refractor. Such a residual oscillation will mask the exact instant at which the changes in amplitude and phase occur in the decaying seismic signal, and therefore, the identity and exact time of the reflection and/or refraction seismic events will be masked and consequently will not give a true wave form seismogram.

This invention is concerned with the last of the above methods for seismograph exploration wherein I propose to produce a continuous and steady-state sine wave seismic input function until a desired cutoff time, at which time the input wave will be abruptly terminated at a zero amplitude. Immediately following the termination, another special seismic input function simulating the wave form of the distorted residual oscillation, but 180 degrees out of phase therewith, will be introduced into the earth. This special wave form will have an associated frequency spectrum compatible with the filter characteristics of the earth so that no distortion of wave shape will occur in this special wave form as it is introduced into, transmitted through, and is reflected and/or refracted in the earth. By superposition of this special wave form with the residual oscillation inherent with the terminated sine wave function at the receiving station, cancellation of the residual oscillation at the receiving station will occur, thereby giving a seismic output for each reflection and/or refraction event which will be of the form of the abruptly terminated sine wave with no residual wave after the cutoff time. To compose the special input wave form, it is proposed to use a bandpass filter having characteristics similar to those inherent in the earth's filtering action. Adjustment of the filter parameters to give the desired characteristics will be accomplished by trial and error while the output wave form is monitored at the receiving stations.

The composite decaying wave form received at the detecting stations will be of the form of a seismic carrier wave of identical frequency as the input signal before termination which will decay to zero over the time period of the normal seismogram but which during this decay period will contain amplitude and phase modulated events which will take the form of increases or decreases in amplitude or no change and positive or negative changes in phase or no change. Since this present invention provides a means of producing the component terminated sine wave reflection and/or refraction events with no distortion due to the earth's filtering action, these amplitude and phase modulation events will be of a transient form of much higher frequency than the seismic carrier wave above the frequency range of the earth's natural filter. As the termination of a single seismic event may result in no change in amplitude or phase in some cases, the operating mode of this invention may include sequential duty cycles using slightly different input seismic frequencies.

An object of the present invention is the provision of a method of seismograph exploration that will produce a high resolution seismic reflection and/or refraction record that will identify and measure depth of subsurface geologic strata with greater precision and accuracy than has been possible with other exploration methods.

Another object of the present invention is the provision of a method of seismograph exploration that will produce a high resolution seismic reflection and/or refraction record by impressing into the earth a continuous steady-state seismic input signal until a time at which the signal is abruptly terminated at a zero amplitude.

Another object of the present invention is the provision of a method of seismograph exploration that will eliminate the residual oscillation wave form that occurs in the seismic output signal of an abruptly terminated steady-state sine wave signal which has been introduced into, transmitted through, and reflected and/or refracted in the earth.

Another object of the present invention is the provision of a method of seismic exploration that will utilize for the continuous and steady-state input function and for the decaying seismic carrier wave after termination only that part of the seismic energy spectrum which experience in the field of seismic exploration has shown that maximum energy transfer will take place.

Another object of the present invention is the provision of a method of seismic exploration that produces at the receiving stations but not necessarily at other positions along the seismic travel paths seismic reflection and/or refraction events in the form of amplitude or phase modulation on the carrier seismic wave wherein these events will have a much higher frequency spectrum than can normally be used in seismic exploration methods.

Another object of the present invention is the provision of a method of seismic exploration that will utilize an electrical and/or electronic simulation of the frequency bandpass characteristics of the earth to produce a special wave form that is used to eliminate the residual oscillation associated with the seismic output signal after the seismic input signal has been abruptly terminated.

Another object of the present invention is the provision of apparatus that will carry out the above method of seismograph exploration.

Further aims, objects and advantages of this invention will appear from the consideration of the following description and the accompanying drawings showing for purely illustrative purposes embodiments of this invention. It is understood, however, that the description is not to be taken in a limiting sense, the scope of the invention being defined in the appended claims.

Referring to the drawings:

FIGURE 11 is a representation of a typical decaying composite output seismic wave form of the present invention.

Figures 2, 3, 4, 5:
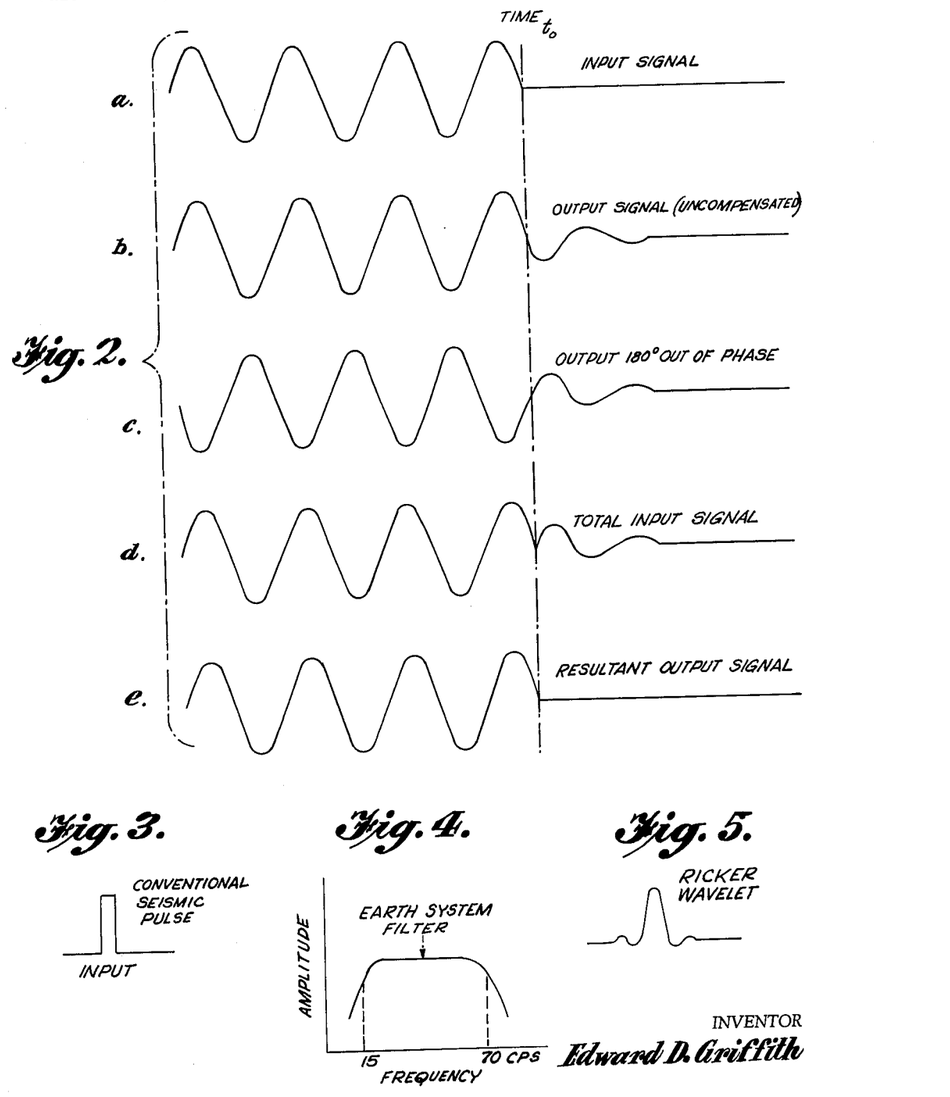
FIGURE 2 illustrates the wave forms associated with the present invention and with the producing of the required input signal that will result in the desired output signal.
FIGURE 3 illustrates the pulse wave form associated with the input signal of the conventional explosive and weight dropping methods of seismic exploration.
FIGURE 4 is a graph of a typical response curve which represents the filtering characteristics of the earth to seismic energy introduced into, transmitted through, and reflected and/or refracted therein.
FIGURE 5 illustrates the wave form associated with the output seismic signal when the conventional seismic pulse of FIGURE 3 has been filtered by the typical response characteristics of FIGURE 4.
Figure 4:
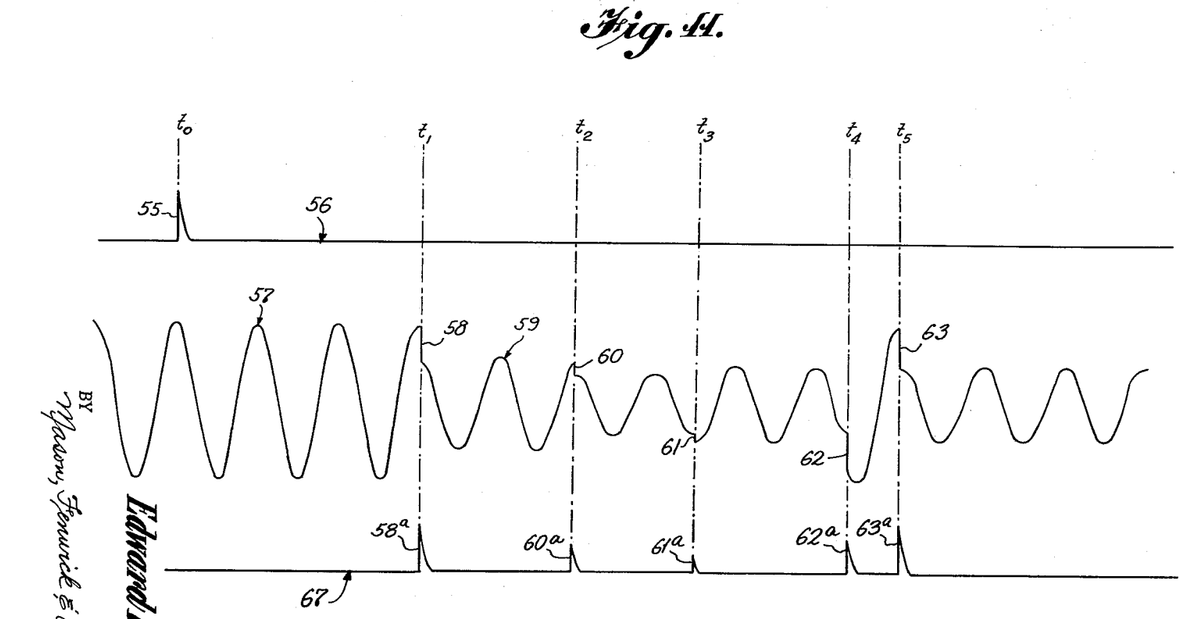

In the drawings, wherein like reference numerals designate the corresponding parts throughout the several figures, the general nature of the invention can best be understood by reference to the wave forms of FIGURE 2 wherein the wave form $a$ shows the desired sinusoidal input signal that has an abrupt termination at a zero amplitude at a "time $t_0$." The term "time $t_0$" indicates the instant that the sinusoidal input signal is abruptly terminated at a zero amplitude in any part of the signal generating apparatus of the present invention, or the instant in the resultant waveform that corresponds to abrupt termination point of the input signal. Geophysical experience shows that a step function will be distorted by the earth's filtering action because the step function has associated with it a broad band frequency spectrum. Therefore, it is important that the sine wave by terminated at a zero potential or amplitude at time $t_0$. This minimizes the width of the frequency spectrum associated with the terminated function and thereby minimizes the distortion in this function due to the filtering process in the earth, and also thereby allows the special seismic wave to begin at zero potential at time $t_0$ eliminating from this wave any step characteristics which would require a broad band frequency spectrum that would not pass through the earth's filter.

The output seismic wave form at the conventional detecting point after the abruptly terminated seismic signal of curve $a$ has been filtered by the introduction, transmission, reflection and/or refraction process in the earth is shown in curve $b$ where, after the point in time corresponding to the termination point $t_0$ on the input wave, the residual oscillation caused by the earth's filtering action is present and shows a decaying oscillatory wave form. Curve $c$ shows the wave form of curve $b$ after a phase change of 180 degrees, and it is the inventive nature of this invention to combine the input signal of curve $a$ with the 180 degree out of phase residual oscillation wavelet after time $t_0$ of curve $c$ to form a total input signal as shown in curve $d$. After the total input signal has passed through the earth's filter, the resultant output signal will be the true terminated sine wave form of curve $e$.

Figure 1:
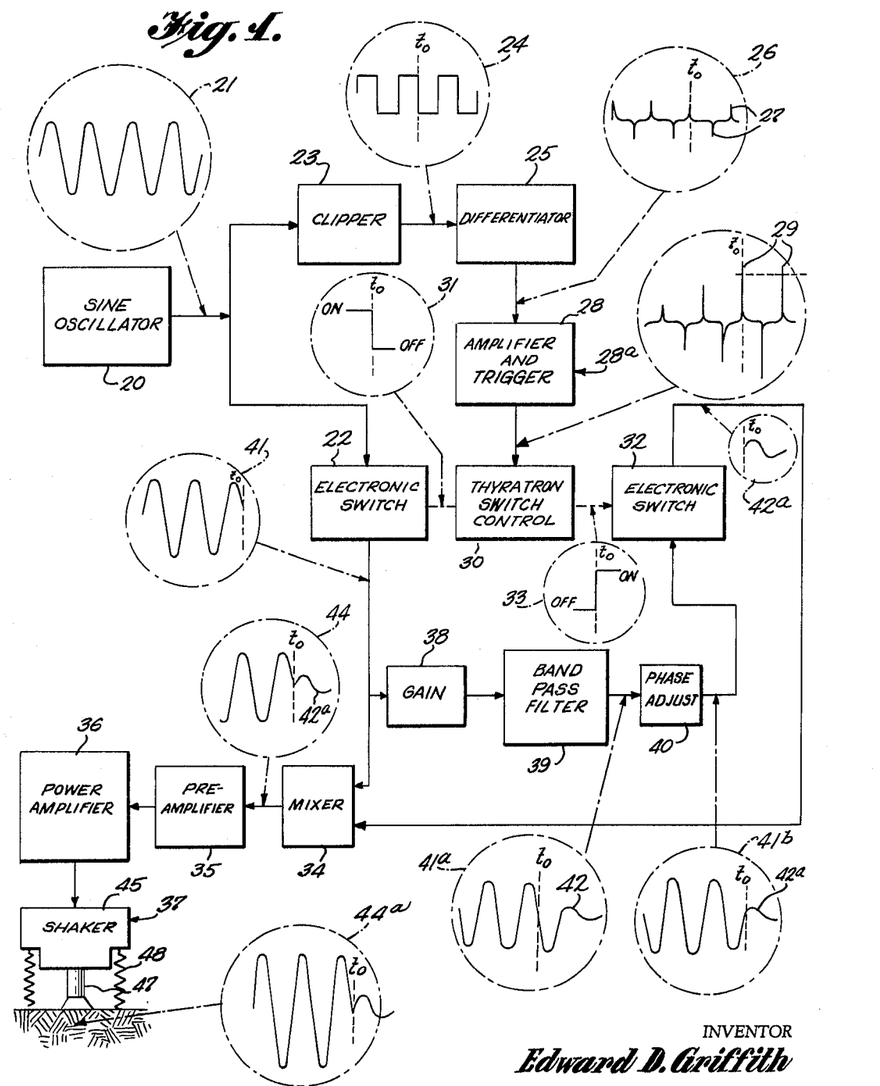
FIGURE 1 is a block diagram illustrating the various components of the present invention.

Referring to FIGURE 1, showing a block diagram of the electrical and/or electronic components, the present invention comprises a conventional sine wave oscillator 20 for producing an electrical analog wave function 21.

The continuous and steady-state sine wave frequency generated before time $t_0$ will lie within the range of about 15 to 70 cycles per second where previous geophysical experience has shown that, under normal conditions, maximum energy transfer into, transmission through, and reflection and/or refraction in the earth can be expected. The steady-state sine wave function 21 is transmitted simultaneously to an electronic switch 22 and to a clipper 23. The clipper 23, of known design, functions to produce a square wave 24 which is then supplied to a conventional differentiator 25 which, by differentiation, produces a spiked signal 26 wherein spikes, indicated at 27, are generated to coincide with the zero potential of the original sinusoidal function. The spiked signal 26 is introduced into the amplifier and trigger combination 28 where the gain of the spike component 27 is, at an appropriate time, increased to a predetermined amplitude 29 so that the output from the amplifier and trigger combination 28 is sufficient to trigger the thyratron switch control 30 which in turn signals the electronic switch 22 and causes it to operate from an "on" position to an "off" position at time $t_0$, as shown at 31 and the sinusoidal signal passing through the electronic switch 22 is abruptly terminated at zero potential. The thyratron switch control 30 simultaneously signals electronic switch 32 from an "off" position to an "on" position as shown at time $t_0$ to allow the passing of a special wave form which is a component of the seismic total input signal as will be described later.

Before time $t_0$, the sinusoidal input wave function 21 has been continuously passed through electronic switch 22, introduced into the conventional mixer 34, preamplifier 35 and the power amplifier 36 where the input electrical wave function 21 has been suitably power amplified before being introduced into the earth shaker 37. Upon being supplied to the earth shaker 37, the sinusoidal input signal 21 is transmitted into the earth in a manner to be described later. During this same time before time $t_0$ the sinusoidal electrical analog input signal 21 has also passed into the earth filter system simulator of the type contemplated by this invention, as shown by the schematic diagram of FIGURE 10, which comprises a gain control 38, a band pass filter 39, and a phase shifter 40. The band pass filter 39 has three banks of low cutoff RC filter networks 39a to provide adjustment of both frequency and slope of the attenuation characteristics at the low frequency end and three banks of high cutoff RC networks 39b to provide the same capability at the high frequency end of the spectrum. The parameters of the band pass filter 39 are suitably adjustable in order that the earth's filtering action may be matched and simulated to provide an electrical input residual oscillation wavelet 42a that corresponds to the seismic residual oscillation found in the exploration locale. Passing through the gain control 38, the band pass filter 39 responds to the terminated sine wave function 41 which simulates the earth's filter characteristics producing the wave form 41a which represents an electrical analog of a seismic event signal at the detecting stations with the inherent residual oscillation 42 present after time $t_0$. This wave form 41a is passed through the phase shifter 40 to change the phase 180 degrees, or whatever the amount found to be necessary in this exploration method. This phase adjusted wave form 41b is then applied to the electronic switch 32.

At time $t_0$ the thyratron switch control 30 switches the electronic switch 32 from an "off" position to an "on" position thereby allowing only the properly phased input residual oscillation wavelet 42a to pass to the mixer 34, there a total input function 44 composed of the terminating sine wave 41 and the phase adjusted residual oscillation 42a, is produced. This total input function, which corresponds to the wave shown in FIGURE 2d, is then introduced into the earth through means of the shaker 37.

Figure 6:
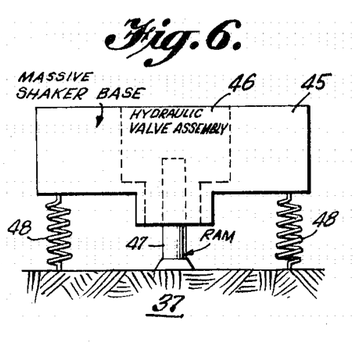
FIGURE 6 is a diagrammatic showing of one embodiment of the mechanical seismic energy source of the present invention.
Figure 7:
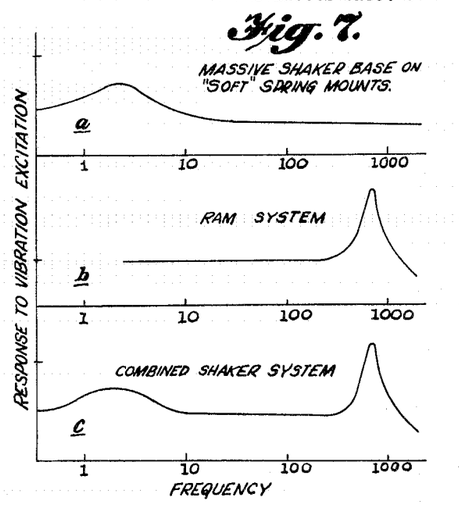
FIGURE 7 shows graphs of the mechanical response or transmissibility curves of the various portions of the seismic energy source.
Figure 8:
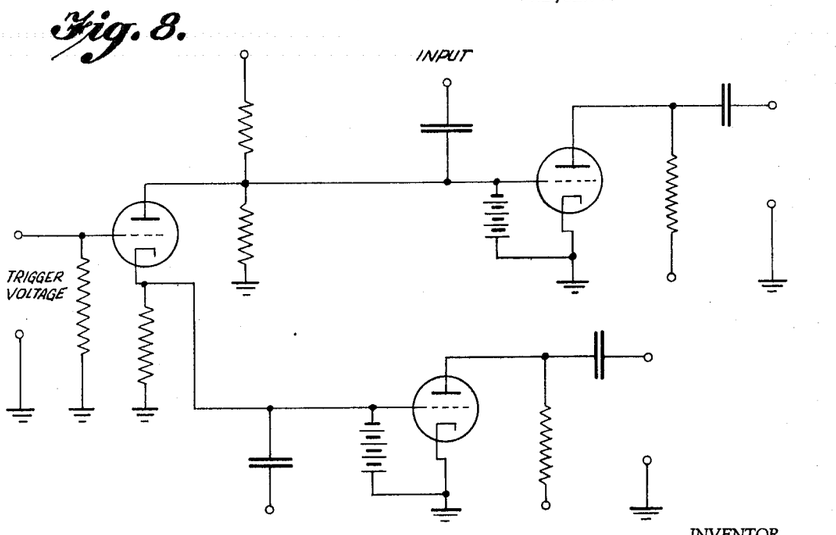
FIGURE 8 is a schematic diagram of the thyratron switch control and two electronic switches associated therewith.

The earth shaker 37, as contemplated by this invention, and shown particularly in FIGURE 6, preferably has a suitable massive mass member 45 in which is situated a hydraulic valve vibrator assembly 46 or an equivalent electrodynamic vibrator assembly that controls the movement of the earth ram 47 for producing the force necessary to generate the total input function 44. Supporting the mass member 45 are "soft" mounts or springs 48 thereby producing a spring-mass mechanical system with natural resonance characteristics of frequency less than the system operating range of frequencies from 15 to 70 cycles per second. The mechanical response or transmissibility curve of this massive base 45 on its springs 48 is shown in FIGURE 7a. The hydraulic valve vibrator assembly 46, or its equivalent electrodynamic vibrator assembly, with its ram 47 will be of conventional design with its natural mechanical resonance above 1000 cycles per second, far above the system operating range of frequencies. The mechanical response or transmissibility curve of the shaker-ram system is shown in FIGURE 7b. Between these two natural mechanical resonance frequency conditions, the earth shaker 37 will have a flat frequency response curve with respect to both amplitude and phase as shown in FIGURE 7c.

The massive base of this shaker system 37 provides a "D.C." seismic bias force or undirectional gravitational force component upon the earth. The seismic input signal will be introduced into the earth as an alternating or "A.C." force component about the value of this "D.C." bias force. Such a shaker system as has been described, will be capable of producing a seismic input signal having a frequency spectrum contained between the limits of the flat portion of the response curve in FIGURE 7c from about 10 to 1,000 cycles per second. Since operation of the shaker system 37 will be of a transient nature in part, it can be expected that residual oscillations may occur at either or both of the natural resonances after time $t_0$. However, these residual oscillations will be outside operating frequency limits of this seismic exploration method and will be filtered out by either the natural filtering action of the earth or by a suitable filter system in the seismic signal detection system 49 that will be used for receiving the seismic output signal at the detecting stations.

Within the scope of this invention the term "continuous" is defined to mean an uninterrupted flow of mechanical energy into the earth before time $t_0$.

The term "steady-state" in this invention is defined as the conditions existing when a continuous sine wave seismic function of constant frequency and amplitude is introduced into the earth, is transmitted through the earth, and is reflected and/or refracted in the earth for a period of time equal to or greater than the time required for the elastic wave to travel from the point of introduction to the deepest reflecting and/or refracting geologic subsurface interface and back to the previously predetermined detecting station. It is understood that in this steady-state situation the output seismic sine wave at the detecting sations is made up of the superposition of all of the sine wave components from the direct, reflected, and/or refracted seismic travel paths that exist at any particular survey location.

Within the scope of this invention the term total seismic input is defined as the terminated sine wave function immediately followed by the special seismic wave which duplicates except for an appropriate phase shift the expected residual oscillation at the receiving station.

The term "decaying composite wave" is defined as the signal that results after the continuous steady-state sine wave has been terminated. This wave will be characterized by a carrier wave of predetermined frequency and will initially have the amplitude of the steady-state seismic output and will over the time period of the normal exploration seismogram decay to zero amplitude; however, between these limits the carrier wave will contain amplitude and phase modulation events in which case the amplitude will increase, decrease, or remain constant and the phase will change positively, negatively or remain constant.

In the method, mentioned previously, wherein the steady-state sine wave is terminated, these seismic events have frequency content consistent with the filter characteristics of the earth at the particular survey location; however, in the present invention wherein a true form terminated sine wave is produced from each seismic event at the detecting stations, these seismic events as they occur as information signals on the carrier wave will have frequency characteristics much higher than will normally be transmitted through the earth and much higher than the carrier seismic wave.

In FIGURE 11, showing a trace of the resultant decaying composite seismic wave to be expected from the present invention, the instant $t_0$ at which the input seismic sine wave 41 is abruptly terminated at the sending station is indicated by the "time break" 55 on trace 56. The time at which the train of waves from the first direct, reflected and/or refracted seismic travel path ceases to be a component of the received composite signal 57 at geophone 50 is indicated at 58 by a sharp change in amplitude and phase. Since the termination of composite signal 57 contains no residual oscillation or distortion characteristic of prior art methods the seismic event 58 will take the form of a sharp spike 58a as shown on the demodulated and detected trace 67. After seismic event 58, the composite output wave 57 is made up of section 59 produced by the summation of all trains of waves reflected and/or refracted from deeper subsurface interfaces. In a similar manner seismic events occur at 60, 61, 62 and 63. Such aforementioned seismic events may increase, decrease or remain constant in amplitude and have a positive, negative or possibly no change in phase. Each seismic event will produce a sharp spike, indicated by 60a, 61a, 62a and 63a, on the demodulated and detected trace 67.

Figures 9, 10:
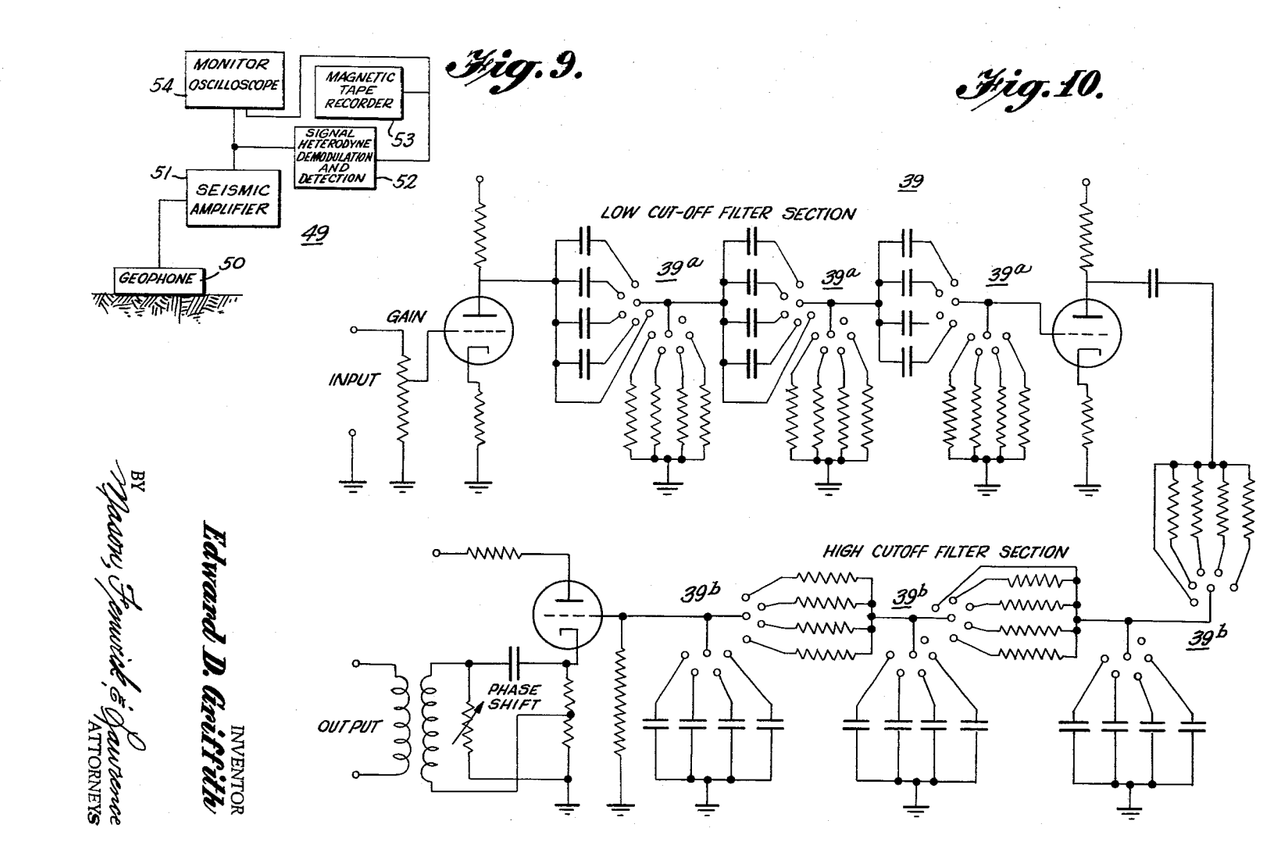
FIGURE 9 is a block diagram of the seismic output signal detection, amplifying, monitoring, heterodyning, demodulating-detecting, and recording system.
FIGURE 10 is a schematic diagram of the simulated earth bandpass filter and phase shift network of the present invention.

The seismic signal detection system 49 as contemplated in the present invention, and as shown in FIGURE 9, is one of well-known components having a detecting geophone 50 placed in contact with the earth and will be of suitable type to pass frequencies up to 1,000 cycles per second, which is the normal operating range of the present invention. From the geophone 50 the received waves will be amplified by a seismic amplifier 51 and then passed to a demodulator and detector 52. It is understood that the seismic amplifier 51 is of well known design and may include automatic gain controls and seismic filter systems. For efficient demodulation the aforementioned low frequency carrier wave will be increased by a heterodyne process to about 5,000 cycles per second. The demodulation and detection stage 52 is conventional in nature wherein the demodulation is sensitive both to phase and amplitude changes in the carrier signal and the detector is used to regain the seismic information signal. This signal from stage 52 will be normally recorded by any of the well known seismic recording instruments which give the record of the seismic events that are desired to be retained as represented by the magnetic recorder 53, and such recording system forms no part of the present invention, but is merely shown for informative purposes. It is understood that these recording instruments may include provision for "stacking" records sequentially in order to increase the signal to noise ratio in the conventional seismic manner, and in this process in the present invention the carrier frequency may be changed to assure the presence of all reflected and/or refracted seismic events. For the purpose of checking the operation of the shaker system and setting the carrier seismic input signal on an efficient earth entry and transmission frequency, a monitor oscilloscope 54 is provided that will give a visual indication of the output signal before and after the heterodyne and demodulation stage 52.

In operation of the present invention an area of primary importance is the reproduction of the residual oscillation wavelet of the output signal, as shown by FIGURE 2b and its introduction into the earth, properly phased, as the special wave form, as part of the total input function 44. As the wave propagation characteristics of the earth change with each seismic exploration location, so will the wave form of the residual oscillation, thereby necessitating a change in the proposed input residual oscillation wavelet, or special wave, 42a with each change of exploration location. The normal procedure of determining the correct input residual oscillation wavelet 42a, or special wave, may be based on previous information known about the prospecting location or by introducing the proposed terminated sine wave function 41 into the earth along with a special wave produced by an arbitrary filter setting simulating the rough natural band pass frequency characteristics of the earth. The ouput of this operation is viewed on a receiving oscilloscope and the adequacy of the filter setting is judged by the operator. By trial and error the appropriate filter setting is determined. The filter setting is satisfactory when a high resolution seismogram is produced.

The mathematical representation of the seismogram method of exploration of the present invention for a single event may be described the convolution integral shown below:

$$o(t) = \frac{1}{T}\int_0^T x(t)h(\tau-t)dt$$

where $o(t)$ is the seismic output function, $h(t)$ is the weighting function characteristic of the earth's inherent filter in the time domain, $x(t)$ is the seismic input function, and $\tau$ is an arbitrary displacement time interval, wherein a total input function $x(t)$ is designed for this method such that when applied to the earth at the sending station the resulting seismic output function $o(t)$ at the plurality of detecting stations will be a true form terminated sine wave function, and wherein this process can be repeated at each and every seismic survey location without regard for changes in the weighting function $h(t)$ which may occur at said various survey locations.

At such time as desired to make a recording of the subsurface geologic strata, the earth shaker apparatus 37 is positioned at a predetermined site suitable for making seismic recordings. The sine wave oscillator is then adjusted to produce a steady state electrical analog sine wave 21 on a frequency, preferably between about 15 to 70 cycles per second, but it is not necessarily limited to this range. The above entry frequency will be determined by signal detection system 49 indicating that maximum energy transfer, or an amount sufficient for operation, is being achieved through the earth. The sine wave 21 is then fed through electronic switch 22, mixer 34, preamplifier 35 and power amplifier 36 to properly prepare it for input to the shaker 37 where it operates upon the control means for the hydraulic valve vibrator assembly 46, or the equivalent electrodynamic vibrator assembly, which drives ram 47 thereby introducing the desired seismic sine wave function into the earth.

The electrical analog sine wave function 21 is simultaneously supplied from the sine oscillator 20 into the gain control 38 and the band pass filter 39 which has been adjusted to simulate the filter characteristics of the earth. The signal from the band pass filter 39 is appropriately phase shifted to produce the signal as shown in FIGURE 2c. This waveform is blocked by the electronic switch 32, which during this time period is in an 'off' position. At an arbitrary time $t_0$, the gain of the signal in the trigger circuit 28 is increased upon a signal from trigger activator 28a whereby the trigger voltage, as represented by the zero potential spikes 29, is sufficient to activate thyratron switch control 30. Upon the operation of the thyratron switch control 30 electronic switch 22 moves from an "on" position to an "off" position to block the sine oscillator produced sine wave function and the electronic switch 32 moves from "off" to "on" allowing the compensating residual oscillation wavelet, or special wave, to be passed to the mixer 34 where the abruptly terminated sine wave 41 is mated with wavelet 42a to produce the total input function 44. After being suitably amplified in the power amplifier stage 36, the total input function 44 operates the hydraulic valve vibrator assembly 46, or the equivalent electrodynamic vibrator assembly, to drive the shaker ram 47 in the desired manner whereby the seismic input wave function assumes the form 44a.

As seismic wave 44a is introduced into the earth, and transmitted to each interface in the geologic substrata a reflected and/or refracted wave is sent back to the surface. By means of the earth's filtering action during this process the total seismic input function is transformed into a terminated sine wave function at the receiving stations. These individual seismic reflection and/or refraction waves will combine to produce the composite output wave form at the detection stations, where it is detected by a suitable geophone 50 and is amplified and demodulated in order that a printed record may be obtained on a single trace. In general, however, seismograms are multi-trace recordings showing a separate trace for each series of reflection and/or refraction events down to the depth of the deepest geologic layer of interest in the earth. In such case of multi-trace recordings there would have to be a plurality of amplifiers 51, each of which would have an automatic gain control so that the amplitude of each trace will remain essentially at a pre-set value in spite of the changes in intensity of the ground vibration as the seismic energy gets progressively weaker as the distance to the subsurface interface gets deeper. With such an apparatus set-up, each trace of the multi-trace record is distinct and may readily be distinguished from all the other traces. With the abrupt termination of the sine wave function marking each reflection and/or refraction seismic event in the form of amplitude and phase modulation in the low frequency carrier wave, the received information signal will have a frequency spectra in a range from 100 to 1,000 cycles per second. Therefore it will be appreciated that the basic nature of the composite output signal will be a low frequency carrier wave on which high frequency information signals exist.

The above description has shown that a high resolution seismic reflection and/or refraction record may be obtained by impressing into the earth a steady-state sinusoidal signal which is terminated and which contains at the seismic output detection stations the after "shot instant" distorted portion of the terminated sine wave function of prior art devices where the known methods of seismograph exploration normally produce a recording of seismic events whose exact travel time and identifying character is masked by a distorted residual oscillation received after the "shot instant" time $t_0$ as shown in FIGURE 2b. But by taking a wave form similar to this distorted residual oscillation after time $t_0$ and properly phasing it to be 180 degrees out of phase from the normal output and entering it immediately after time $t_0$ with the terminated sine wave signal, it has been found that no residual oscillation wavelet is received at the detecting geophone and the recorded seismic output will appear with high resolution.

While I have particularly shown and described one particular embodiment of the invention, it is distinctly understood that the invention is not limited thereto but that modification may be made within the scope of the invention and such variations as are covered by the scope of the appended claims.

What is claimed is:

1. A method of seismograph exploration comprising generating at a sending station a continuous input sine wave seismic signal of predetermined constant frequency and amplitude for a time at least sufficient to establish at a plurality of detecting stations a steady-state output seismic signal which has been introduced into, transmitted through, and redirected in the earth abruptly terminating the generation of said continuous input seismic signal, immediately thereafter generating a special seismic wave which duplicates terminal distortion that occurs in the form of a decaying residual oscillation after the termination of the sine wave when said signal arrives at the plurality of detecting stations caused by the earth's filtering action in the process of introduction, transmission, and redirection of the seismic energy, said special wave having its associated frequency spectrum limited to frequencies which pass efficiently through the said earth's filtering action without distortion and having a wave form which will cancel the residual oscillation of the said terminal distortion as said special wave and said terminal distortion of the seismic signal arrive in superposition at the plurality of detecting stations so that a true form seismic sine wave terminated at zero amplitude is thereby produced at said detecting stations for each seismic event from each geologic subsurface interface, and thereby producing at said plurality of detecting stations by the superposition of special wave and said terminal distortion of seismic signal in a time relation determined by their respective seismic ray paths and the related seismic velocities a composite output seismic wave.

2. A method of seismograph exploration wherein a continuous input sine wave seismic signal terminated abruptly at zero amplitude and free of the terminal distortion that normally occurs in the form of a decaying residual oscillation is provided at each of a plurality of detecting stations, comprising the steps of generating at a sending station a sine wave, producing from said sine wave a continuous input sine wave seismic signal of predetermined constant frequency and amplitude for a time at least sufficient to establish at a plurality of detecting stations a steady-state output seismic signal which has been introduced into, transmitted through, and redirected in the earth, abruptly terminating the generation of said sine wave and continuous input seismic signal, immediately thereafter generating a special seismic wave responsive to energy derived from said sine wave which duplicates the terminal distortion that occurs in the form of decaying residual oscillation after the termination of the sine wave when said signal arrives at the plurality of detecting stations caused by the earth's filtering action in the process of introduction, transmission, and redirection of the seismic energy, said special wave having its associated frequency spectrum limited to frequencies which pass efficiently through the said earth's filtering action without distortion and having a wave form which will cancel the residual oscillation of the said terminal distortion as said special wave and said terminal distortion of the seismic signal arrive in superposition at the plurality of detecting stations so that a true form seismic sine wave terminated at zero amplitude is thereby produced at said detecting stations for each seismic event from each geologic subsurface interface, and thereby producing at said plurality of detecting stations by the superposition of special wave and said terminal distortion of said seismic signal in a time relation determined by their respective seismic ray paths and the related seismic velocities a composite output seismic wave.

3. A method of seismograph exploration as defined in claim 1 wherein the seismic redirection method of exploration for a single event is described by the mathematical relation given by the convolution integral $$o(t) = \frac{1}{T}\int_0^T x(t)h(\tau-t)dt$$

where $o(t)$ is the seismic output function, $h(t)$ is the weighting function characteristic of the earth's inherent filter in the time domain, $x(t)$ is the seismic input function, and $\tau$ is an arbitrary displacement time interval, wherein a total input function $x(t)$ is designed for this method such that when applied to the earth at the sending station the resulting seismic event output function $o(t)$ at the plurality of detecting stations will be a true form terminated sine wave function, and wherein this process can be repeated at each and every seismic survey location without regard for changes in the weighting function $h(t)$ which may occur at said various survey locations.

4. In a seismograph exploration system having means for generating at a sending station a sine wave, seismic signal generating means producing from said sine wave a continuous input sine wave seismic signal of predetermined constant frequency and amplitude for a time at least sufficient to establish at a plurality of detecting stations a steady-state output seismic signal which has been introduced into, transmitted through, and redirected in the earth, and means for abruptly terminating the generation of said sine wave and continuous input seismic signal, the improvement comprising earth characteristics simulator means for generating responsive to energy derived from said sine wave and immediately after termination thereof a special seismic wave duplicating in inverted phase relation terminal distortion that occurs in the form of a decaying residual oscillation after the termination of the sine wave when said signal arrives at the plurality of detecting stations caused by the earth's filtering action in the process of introduction, transmission, and redirection of the seismic energy, said simulator means including means causing the associated frequency spectrum of said special wave to be limited to frequencies which pass efficiently through the said earth's filtering action without distortion and producing a wave form which will cancel the residual oscillation of the said terminal distortion as said special wave and said terminal distortion of the seismic signal arrive in superposition at the plurality of detecting stations so that a true form seismic sine wave terminated at zero amplitude is thereby produced at said detecting stations for each seismic event from each geologic subsurface interface.

5. In a seismograph exploration system having means for generating at a sending station a sine wave, seismic signal generating means producing from said sine wave a continuous input sine wave seismic signal of predetermined constant frequency and amplitude for a time at least sufficient to establish at a plurality of detecting stations a steady-state output seismic signal which has been introduced into, transmitted through, and redirected into the earth, and means for abruptly terminating the generation of said sine wave and continuous input seismic signal, the improvement comprising means normally coupling said sine wave to said means for generating said seismic signal responsive thereto, means responsive in part to occurrence of zero potential conditions of said sine wave for selectively terminating coupling of said sine wave to said seismic signal generating means at a zero potential condition of said sine wave, an earth characteristics simulator circuit for producing an output signal which duplicates terminal distortion that occurs in the form of a decaying residual oscillation after the termination of the sine wave when said signal arrives at the plurality of detecting stations caused by the earth's filtering action in the process of introduction, transmission, and redirection of the seismic energy, a phase shift circuit to selectively adjust the phase relation of the output of said earth characteristics simultator, means normally inoperative to couple output signals from said simulator circuit to said seismic signal generating means for selectively coupling said output signals to the latter responsive to termination of said sine wave to compose a total earth input function from the sine wave output signals for application to said seismic signal generating means.

6. In a seismograph exploration system having means for generating at a sending station a sine wave, seismic signal generating means producing from said sine wave a continuous intput sine wave seismic signal of predetermined constant frequency and amplitude for a time at least sufficient to establish at a plurality of detecting stations a steady-state output seismic signal which has been introduced into, transmitted through, and redirected in the earth, and means for abruptly terminating the generation of said sine wave and continuous input seismic signal, the improvement comprising means normally coupling said sine wave to said means for generating said seismic signal responsive thereto, means responsive in part to occurrence of zero potential conditions of said sine wave for selectively terminating coupling of said sine wave to said seismic signal generating means at a zero potential condition of said sine wave, an earth chartacteristics simulator circuit for producing an output signal which duplicates terminal distortion that occurs in the form of a decaying residual oscillation after the termination of the sine wave when said signal arrives at the plurality of detecting stations caused by the earth's filtering action in the process of introduction, transmission, and redirection of the seismic energy, a phase shift circuit to selectively adjust the phase relation of the output of said earth characteristics simulator, an electronic switch which normally blocks the output of said simulator and is operative to pass said output upon termination of said sine wave, a mixer to sequentially pass said continuous input sine wave and said output of the earth characteristics simulator to compose, a total earth input function from the sine wave and output signals, and means interposed between said mixer and seismic signal generating means for applying a voltage amplified and power amplified version of the composed total earth input function to the latter.

7. A seismograph exploration system as defined in claim 5, wherein said earth characteristics simulator comprises a band pass filter having variable cutoff and attenuation parameters at both the high and low frequency ends of the frequency spectrum associated with the earth's filtering action.

8. In a seismograph exploration system having means for generating at a sending station a sine wave, seismic signal generating means producing from said sine wave a continuous input sine wave seismic signal of predetermined constant frequency and amplitude for a time at least sufficient to establish at a plurality of detecting stations a steady-state output seismic signal which has been introduced into, transmitted through, and redirected in the earth, and means for abruptly terminating the generation of said sine wave and continuous input seismic signal, means normally coupling said sine wave to said means for generating said seismic signal responsive thereto, means responsive in part to occurrence of zero potential conditions of said sine wave for selectively terminating coupling of said sine wave to said seismic signal generating means at a zero potential condition of said sine wave, an earth characteristics simulator circuit for producing an output signal which duplicates terminal distortion that occurs in the form of a decaying residual oscillation after the termination of the sine wave when said signal arrives at the plurality of detecting stations caused by the earth's filtering action in the process of introduction, transmission, and redirection of the seismic energy, a phase shift circuit to selectively adjust the phase relation of the output of said earth characteristics simulator, an electronic switch which normally blocks the output of said simulator and is operative to pass said output upon termination of said sine wave, a mixer to sequentially pass said continuous input sine wave and said output of the earth characteristics simulator to compose a total earth input function from the sine wave and output signals, means interposed between said mixer and seismic signal generating means for applying a voltage amplified and power amplified version of the composed total earth input function to the latter, and wherein said seismic signal generating means comprises a massive base member, an earth vibrator supported within said base member, means supporting said base member upon the earth to provide the base member with a natural resonance having a frequency less than the lowest operating frequency of the exploration system, said earth vibrator being so constructed as to have a natural resonance frequency greater than the highest operating frequency of the exploration system.

No references cited.

BENJAMIN A. BORCHELT, *Primary Examiner*.

R. M. SKOLNIK, *Assistant Examiner*.